United States Patent
Lutas (10) Patent No.: US 9,507,727 B2
(45) Date of Patent: Nov. 29, 2016

(54) PAGE FAULT INJECTION IN VIRTUAL MACHINES

(71) Applicant: Bitdefender IPR Management Ltd., Nicosia (CY)

(72) Inventor: Andrei V. Lutas, Satu Mare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 227 days.

(21) Appl. No.: 14/289,163

(22) Filed: May 28, 2014

(65) Prior Publication Data

US 2015/0026807 A1  Jan. 22, 2015

Related U.S. Application Data

(60) Provisional application No. 61/847,538, filed on Jul. 17, 2013.

(51) Int. Cl.
| | |
|---|---|
| G06F 12/00 | (2006.01) |
| G06F 12/10 | (2016.01) |
| G06F 21/54 | (2013.01) |
| G06F 21/79 | (2013.01) |
| G06F 9/455 | (2006.01) |
| G06F 21/53 | (2013.01) |
| G06F 12/08 | (2016.01) |

(52) U.S. Cl.
CPC ....... *G06F 12/1009* (2013.01); *G06F 9/45558* (2013.01); *G06F 21/53* (2013.01); *G06F 21/54* (2013.01); *G06F 21/79* (2013.01); *G06F 12/08* (2013.01); *G06F 2009/45583* (2013.01); *G06F 2009/45587* (2013.01); *G06F 2009/45591* (2013.01)

(58) Field of Classification Search
CPC .......... G06F 12/1009; G06F 9/45558; G06F 21/54; G06F 21/79; G06F 2009/45591; G06F 2009/45587; G06F 2009/45583; G06F 12/08
USPC .................................................... 726/22–25
See application file for complete search history.

(56) References Cited

U.S. PATENT DOCUMENTS

| | | | |
|---|---|---|---|
| 8,117,373 | B2 | 2/2012 | Berlin |
| 8,135,899 | B1 | 3/2012 | Dobrovolskiy et al. |
| 8,261,265 | B2 | 9/2012 | Chen et al. |
| 8,607,013 | B2 | 12/2013 | Chen et al. |

(Continued)

OTHER PUBLICATIONS

European Patent Office, International Search Report and Written Opinion Mailed Oct. 20, 2015 for PCT International Application No. PCT/RO2014/000018, international filing date Jul. 2, 2014, priority date Jul. 17, 2013.

(Continued)

*Primary Examiner* — Midys Rojas
(74) *Attorney, Agent, or Firm* — Law Office of Andrei D Popovici, PC (57) ABSTRACT

Described systems and methods allow protecting a host system from malware using virtualization technology. In some embodiments, a memory introspection engine operates below a virtual machine (VM) executing on the host system. The engine is configured to analyze the content of a virtual memory page used by software executing within the VM, and/or to protect the respective content from unauthorized modification, for instance by malware. When the respective content is swapped out of memory, the memory introspection engine injects a page fault into the respective VM, to force a swap-in of the respective content.

23 Claims, 7 Drawing Sheets

(56) References Cited

U.S. PATENT DOCUMENTS

2009/0113425 A1 4/2009 Ports et al.
2011/0082962 A1 4/2011 Horovitz et al.
2012/0030406 A1 2/2012 Chang et al.
2013/0007409 A1 1/2013 Ganesh et al.
2013/0091318 A1 4/2013 Bhattacharjee et al.
2014/0068614 A1 3/2014 Chen et al.
2014/0089450 A1 3/2014 Raindel et al.

OTHER PUBLICATIONS

Joshi et al, "Detecting past and present intrusions through vulnerability-specific predicates," Proceedings of the twentieth ACM symposium on Operating systems principles, pp. 91-104, ACM New York, NY, USA, Dec. 2005.

Lange et al., "SymCall: symbiotic virtualization through VMM-to-guest upcalls," Proceedings of the 7th ACM SIGPLAN/SIGOPS international conference on Virtual execution environments, pp. 193-204, ACM New York, NY, USA, Jul. 2011.

PAGE FAULT INJECTION IN VIRTUAL MACHINES

RELATED APPLICATIONS

This application claims the benefit of the filing date of U.S. provisional patent application No. 61/847,538, filed on Jul. 17, 2013, entitled "Page Fault Injection In Virtual Machines", the entire contents of which are incorporated by reference herein.

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

Hardware virtualization technology allows the creation of simulated computer environments commonly known as virtual machines, which behave in many ways as physical computer systems. In typical applications such as server consolidation and infrastructure-as-a-service (IAAS), several virtual machines may run simultaneously on the same physical machine, sharing the hardware resources among them, thus reducing investment and operating costs. Each virtual machine may run its own operating system and/or software applications, separately from other virtual machines. Due to the steady proliferation of malware, each virtual machine operating in such an environment potentially requires malware protection.

A virtualization solution commonly used in the art comprises a hypervisor, also known as a virtual machine monitor, consisting of a layer of software operating between the computing hardware and the operating system (OS) of a virtual machine, and having more processor privileges than the respective OS. Anti-malware operations may be conducted at the privilege level of the hypervisor. Although such configurations may increase security, they introduce an extra layer of complexity and may carry significant computational costs.

There is considerable interest in developing efficient, robust, and scalable anti-malware solutions for hardware virtualization platforms.

SUMMARY

According to one aspect, a host system comprises a hardware processor configured to operate a hypervisor and a memory introspection engine. The hypervisor is configured to expose a virtual machine comprising a virtualized processor and a virtualized memory, the virtual machine configured to employ the virtualized processor to execute a target process. The memory introspection engine executes outside the virtual machine and is configured to determine according to a page table of the virtual machine whether a target page of a virtual memory space of the target process is swapped out of the virtualized memory, and in response, when the target page is swapped out of the virtualized memory, to directly inject a page fault into the virtual machine, the page fault causing an operating system of the virtual machine to map the target page to a page of the virtualized memory.

According to another aspect, a method comprises employing at least one hardware processor of a host system to execute a hypervisor, the hypervisor configured to expose a virtual machine comprising a virtualized processor and a virtualized memory, the virtual machine further configured to employ the virtualized processor to execute a target process. The method further comprises employing the at least one hardware processor to determine whether a target page of a virtual memory space of the target process is swapped out of the virtualized memory, and in response, when the page is swapped out of the virtualized memory, employing the at least one hardware processor to directly inject a page fault into the virtual machine, the page fault causing an operating system of the virtual machine to map the target page to a page of the virtualized memory.

According to another aspect, a non-transitory computer-readable medium stores instructions which, when executed by at least one hardware processor of a host system, cause the host system to form a memory introspection engine, wherein the host system is further configured to execute a hypervisor exposing a virtual machine comprising a virtualized processor and a virtualized memory, the virtual machine configured to employ a virtualized processor to execute a target process. The memory introspection engine executes outside the virtual machine and is configured to determine according to a page table of the virtual machine whether a target page of a virtual memory space of the target process is swapped out of the virtualized memory, and in response, when the target page is swapped out of the virtualized memory, directly inject a page fault into the virtual machine, the page fault causing an operating system of the virtual machine to map the target page to a page of the virtualized memory.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process is an instance of a computer program, such as an application or a part of an operating system, and is characterized by having at least an execution thread and a section of virtual memory assigned to it by the operating system, the respective section comprising executable code. Unless otherwise specified, a page represents the smallest unit of virtual memory individually mapped to a physical memory of a host system. Unless otherwise specified, directly injecting a page fault into a virtual machine comprises inducing a page fault event within a virtualized processor of the respective virtual machine without assistance from an operating system or other software executing within the respective virtual machine. Such direct injection does not exclude the operating system or other software from taking action in response to the injected page fault, for instance to handle the page fault. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
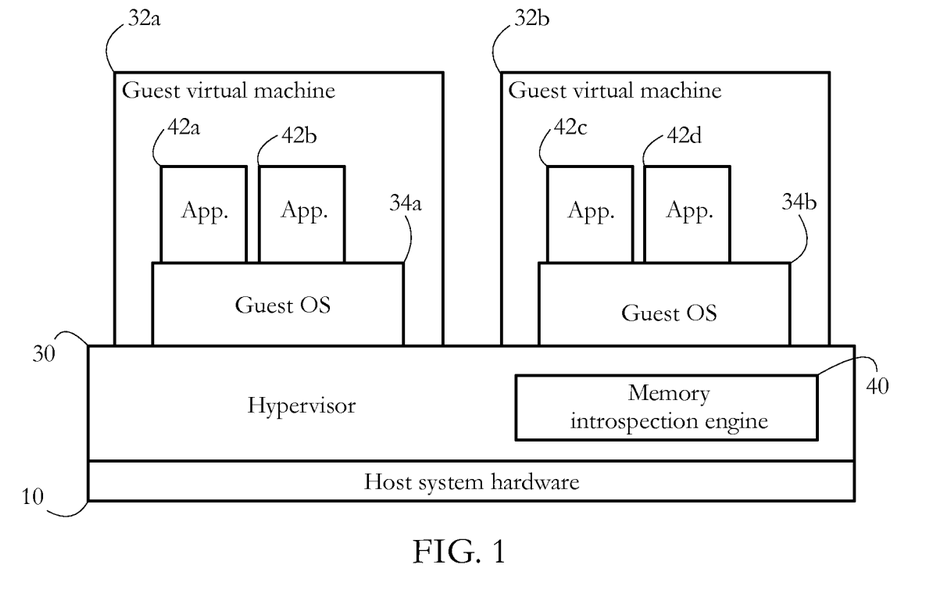
FIG. 1 shows an exemplary set of virtual machines exposed by a hypervisor executing on a host system, and a memory introspection engine protecting the set of virtual machines from malware according to some embodiments of the present invention.

FIG. 1 shows an exemplary configuration of a host system 10 employing hardware virtualization for malware protection according to some embodiments of the present invention. Host system 10 may represent a corporate computing device such as an enterprise server, or an end-user device such as a personal computer or a smartphone. Other exemplary host systems include entertainment devices such as TVs and game consoles, or any other device having a memory and a processor, and requiring malware protection. In the example of FIG. 1, host system 10 executes a set of guest virtual machines 32a-b, exposed by a hypervisor 30. A virtual machine (VM) comprises an abstraction, e.g., a software emulation, of an actual physical machine/computer system, the VM capable of running an operating system and other applications. Hypervisor 30 includes software configured to create a plurality of virtualized devices, such as a virtual processor and a virtual memory controller, and to present such virtualized devices to software, in place of the real, physical devices of host system 10. In some embodiments, hypervisor 30 allows a multiplexing (sharing) by multiple virtual machines of hardware resources of host system 10. Hypervisor 30 may further manage such multiplexing so that each VM operates independently and is unaware of other VMs executing concurrently executing on host system 10. Examples of popular hypervisors include the VMware vSphere™ from VMware Inc. and the open-source Xen hypervisor, among others.

Each VM 32a-b may execute a guest operating system (OS) 34a-b, respectively. A set of exemplary applications 42a-d generically represent any software application, such as word processing, image processing, media player, database, calendar, personal contact management, browser, gaming, voice communication, data communication, and anti-malware applications, among others. Operating systems 34a-b may comprise any widely available operating system such as Microsoft Windows®, MacOS®, Linux®, iOS®, or Android™, among others. Each OS provides an interface between applications executing within a virtual machine and the virtualized hardware devices of the respective VM. In the following description, software executing on a virtual processor of a virtual machine is said to execute within the respective virtual machine. For instance, in the example of FIG. 1, applications 42a-b are said to execute within guest VM 32a, while applications 42c-d are said to execute within guest VM 32b. In contrast, hypervisor 30 is said to execute outside, or below, guest VMs 32a-b.

In some embodiments, hypervisor 30 includes a memory introspection engine 40, configured to perform anti-malware operations as described further below. Engine 40 may be incorporated into hypervisor 30, or may be delivered as a software component distinct and independent from hypervisor 30, but executing at substantially similar processor privilege level as hypervisor 30. A single engine 40 may be configured to malware-protect multiple VMs executing on host system 10.

Figure 2:
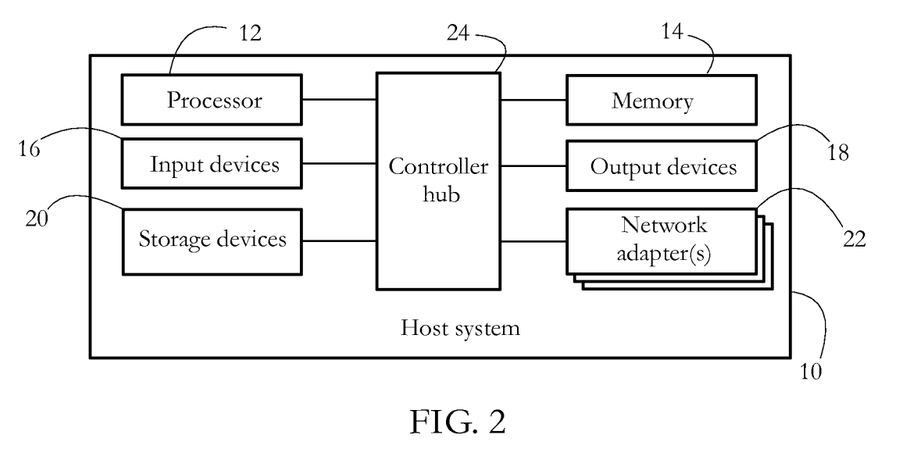
FIG. 2 shows an exemplary hardware configuration of the host system according to some embodiments of the present invention.

FIG. 2 shows an exemplary hardware configuration of a host system 10. System 10 comprises a set of physical devices, including a processor 12, a memory unit 14, a set of input devices 16, a set of output devices 18, a set of storage devices 20, and a set of network adapters 22, all connected by a controller hub 24. In some embodiments, processor 12 comprises a physical device (e.g. multi-core integrated circuit formed on a semiconductor substrate) configured to execute computational and/or logical operations with a set of signals and/or data. In some embodiments, such logical operations are delivered to processor 12 in the form of a sequence of processor instructions (e.g. machine code or other type of software). Memory unit 14 may comprise volatile computer-readable media (e.g. RAM) storing data/signals accessed or generated by processor 12 in the course of carrying out instructions.

Input devices 16 may include computer keyboards, mice, and microphones, among others, including the respective hardware interfaces and/or adapters allowing a user to introduce data and/or instructions into host system 10. Output devices 18 may include display devices such as monitors and speakers among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of software instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 represents the plurality of system, peripheral, and/or chipset buses, and/or all other circuitry enabling the communication between processor 12 and devices 14, 16, 18, 20 and 22. For instance, controller hub 24 may include a memory controller, an input/output (I/O) controller, and an interrupt controller, among others. In another example, controller hub 24 may comprise a northbridge connecting processor 12 to memory 14 and/or a southbridge connecting processor 12 to devices 16, 18, 20, and 22.

To enable configurations as shown in FIG. 1, hypervisor 30 may create a plurality of virtualized devices, each emulating a physical hardware device of system 10. Hypervisor 30 may further assign a set of virtualized devices to each VM 32a-b, and control scheduling, signaling, and communication so that VMs 32a-b can use processor 12 and other hardware devices concurrently. Performing such operations is also known in the art as exposing VMs 32a-b.

Figure 3:
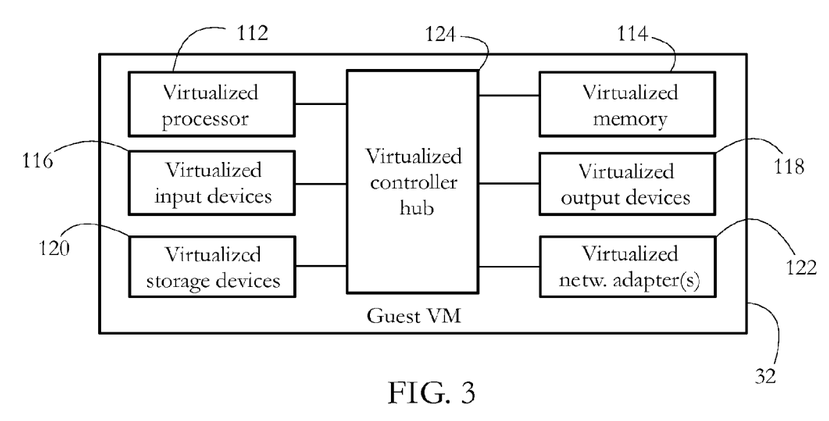
FIG. 3 shows an exemplary configuration of virtualized hardware exposed to a guest virtual machine according to some embodiments of the present invention.

FIG. 3 shows an exemplary configuration of a virtual machine 32, as exposed by hypervisor 30. VM 32 may represent, for instance, any of VMs 32a-b of FIG. 1. VM 32 includes a virtualized processor 112, a virtualized memory unit 114, virtualized input devices 116, virtualized output devices 118, virtualized storage 120, virtualized network adapters 122, and a virtualized controller hub 124. Virtualized processor 112 comprises an emulation of at least some of the functionality of processor 12, and is configured to receive for execution processor instructions forming part of software, such as the operating system and other applications. Software using processor 112 for execution is deemed to execute within virtual machine 32. In some embodiments, virtualized memory unit 114 comprises addressable spaces for storing and retrieving data used by virtualized processor 112. Other virtualized devices (e.g., virtualized input, output, storage, etc.) emulate at least some of the functionality of the respective physical devices of host system 10. Virtualized processor 112 may be configured to interact with such devices as it would with the corresponding physical devices. For instance, software executing within VM 32 may send and/or receive network traffic via virtualized network adapter(s) 122. In some embodiments, hypervisor 30 may expose only a subset of virtualized devices to VM 32 (for instance, only virtualized processor 112, virtualized memory 114, and parts of hub 124). Hypervisor 30 may also give a selected VM exclusive use of some hardware devices of host system 10. In one such example, VM 32a (FIG. 1) may have exclusive use of input devices 16 and output devices 18, but lack a virtualized network adapter. Meanwhile, VM 32b may have exclusive use of network adapter(s) 22.

Figure 4:
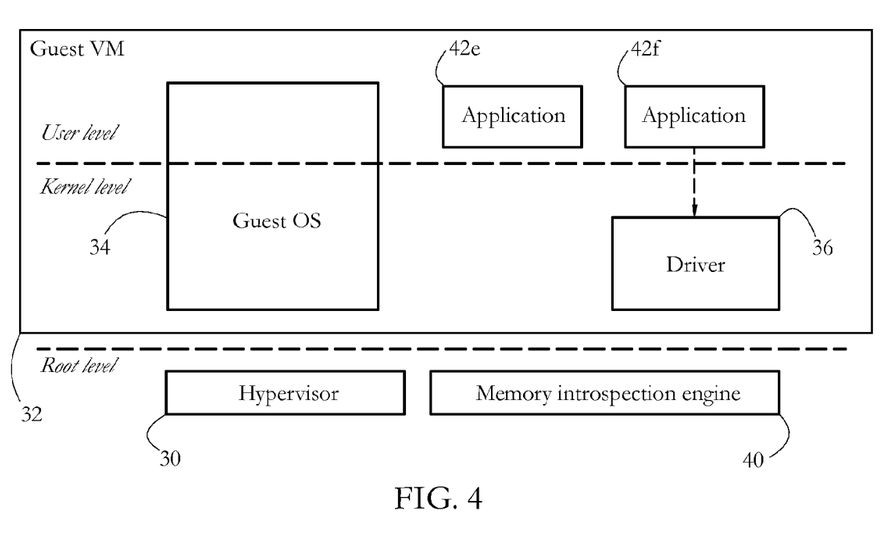
FIG. 4 illustrates an exemplary hierarchy of software objects executing on the host system at various processor privilege levels, according to some embodiments of the present invention.

FIG. 4 illustrates a hierarchy of software objects executing on host system 10 according to some embodiments of the present invention. FIG. 4 is represented from the perspective of processor privilege levels, also known in the art as layers or protection rings. In some embodiments, hypervisor 30 takes control of processor 12 at the most privileged level (e.g., VMXroot on Intel® platforms supporting virtualization, also known as ring −1, or root mode), thus creating a hardware virtualization platform exposed as virtual machine 32 to other software executing on host system 10. An operating system 34, such as OSs 34a-b in FIG. 2, executes within the virtual environment of VM 32, OS 34 having lesser processor privilege than hypervisor 30 (e.g., ring 0 on Intel platforms, or kernel mode). A set of applications 42e-f execute at lesser processor privilege than OS 34 (e.g., ring 3, or user mode). Parts of applications 42e-f may execute at kernel privilege level (for instance, driver 36 installed by application 42f; an exemplary driver 36 performs anti-malware operations such as detecting malware-indicative behavior of software objects and/or detecting malware-indicative signatures within software objects). Similarly, parts of OS 34 may execute in user mode (ring 3).

In some embodiments, introspection engine 40 executes substantially at the same processor privilege level as hypervisor 30, and is configured to perform introspection of virtual machines executing on host system 10, such as VM 32. Introspection of a VM or of a software object executing within the respective VM may comprise analyzing a behavior of the respective software object, for instance, identifying a set of operations performed by the object (for instance, issuing a system call, accessing a registry of the OS, downloading a file from a remote location, writing data to a file, etc.). Introspection may further comprise determining addresses of memory sections containing parts of the software object, accessing the respective memory sections, and analyzing a content stored within the respective memory sections. Other examples of introspection include intercepting and/or restricting access of certain processes such memory sections, e.g., preventing a process from overwriting code or data used by another process. In some embodiments, objects selected for introspection by engine 40 comprise processes, instruction streams, registers, and data structures such as page tables and driver objects of the respective VM, among others.

To perform introspection of VM 32 in a configuration as illustrated in FIG. 1 (i.e., from outside the respective VM), some embodiments of engine 40 employ memory mapping structures and mechanisms of processor 12. Virtual machines typically operate with a virtualized physical memory, e.g., memory 114 in FIG. 3, also known in the art as guest-physical memory. Virtualized physical memory comprises an abstract representation of the actual physical memory 14, for instance as a contiguous space of virtualized addresses specific to each guest VM, with parts of said space mapped to addresses within physical memory 14 and/or physical storage devices 20. In systems configured to support virtualization, such mapping is typically achieved by dedicated data structures controlled by processor 12, known a second level address translation (SLAT). Popular SLAT implementations include extended page tables (EPT, on Intel® platforms), and nested page tables (NPT, on AMD® platforms). In such systems, virtualized physical memory may be partitioned in units known in the art as pages, a page representing the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the EPT/NPT and therefore the mapping between physical memory and virtualized physical memory. The actual mapping (translation) of a virtualized physical memory address to a physical memory address may comprise looking up the physical memory address in a translation lookaside buffer (TLB) of host system 10. In some embodiments, address translation comprises performing a page walk, which includes a set of successive address look-ups in a set of page tables and/or page directories, and performing calculations such as adding an offset of a page to an address relative to the respective page.

Some hardware configurations allow hypervisor 30 to selectively control access to data stored within each page of physical memory 14, e.g., by setting read, write, and/or execute access rights to the respective page. Such rights may be set, for instance, by modifying an entry of the respective page within the EPT or NPT. Hypervisor 30 may thus select which software object may access data stored at the addresses within each page, and may indicate which operations are allowed with the respective data, e.g., read, write, execute. An attempt by a software object executing within a VM to perform an operation, such as writing data to a page to which the object does not have the respective right, or executing code from a page marked as non-executable, may trigger a virtual machine exit event (e.g. a VMExit event on Intel platforms). In some embodiments, virtual machine exit events transfer control of the processor from the VM executing the respective software object to hypervisor 30. Such transfers may allow software executing at the processor privilege level of hypervisor 30 to intercept the unauthorized write or execute attempt. In some embodiments, introspection engine 40 performs such interceptions as part of anti-malware operations.

In some embodiments, OS 34 configures a virtual memory space for a process such as applications 42e-f in FIG. 4, by maintaining a mapping (address translation) between the respective virtual memory space and the virtualized physical memory of VM 32, for instance using a page table mechanism. In some embodiments, the process virtual memory space is also partitioned into pages, such pages representing the smallest unit of virtual memory individually mapped to virtualized physical memory by OS 34, i.e., virtual to virtualized-physical memory mapping is performed with page granularity.

Figure 5:
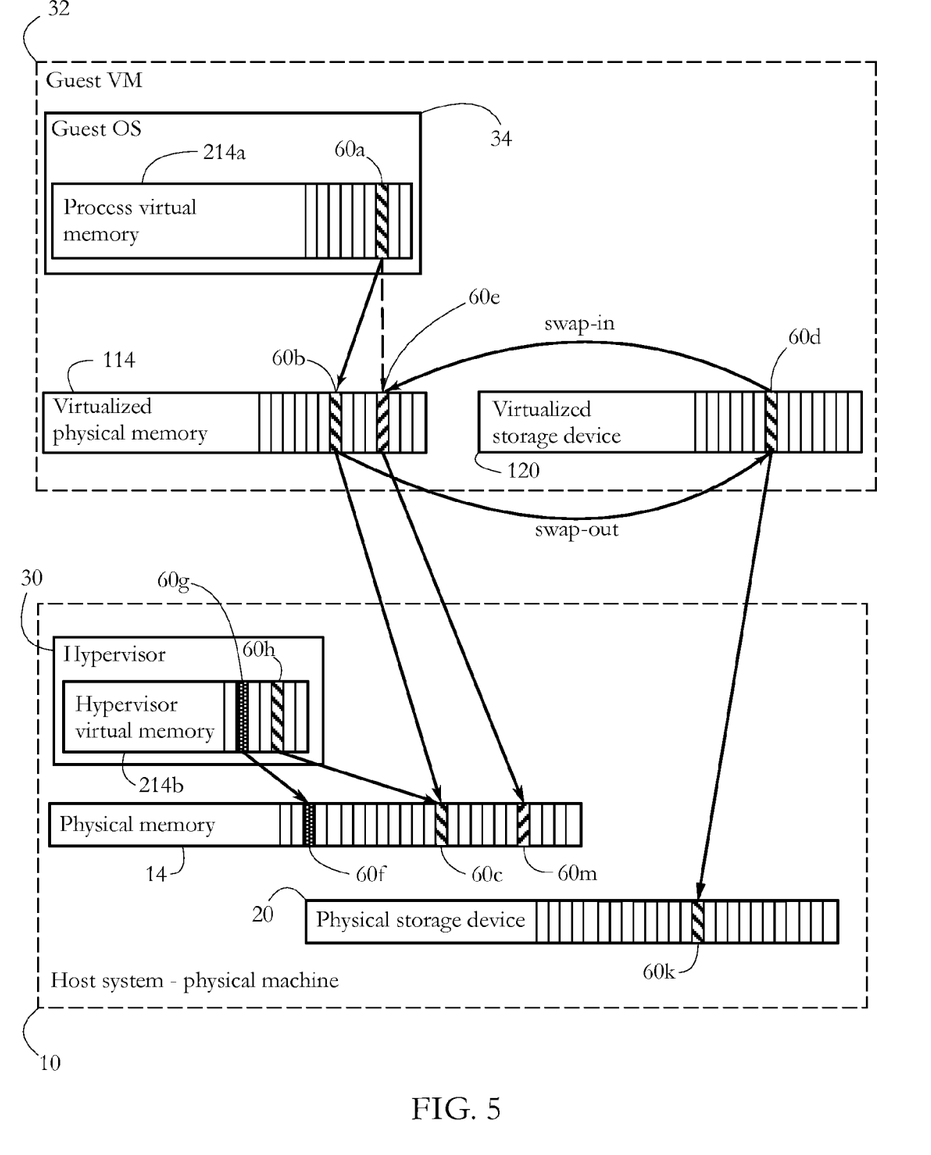
FIG. 5 shows an exemplary mapping of memory addresses and an exemplary swapping of a memory page in and out of virtualized memory according to some embodiments of the present invention.

FIG. 5 illustrates an exemplary mapping of memory addresses in an embodiment as shown in FIG. 4. A software object, such as an application, a process, or a part the operating system executing within guest VM 32, is assigned a virtual memory space 214a by guest OS 34. When the software object attempts to access a content of an exemplary memory page 60a of space 214a, an address of page 60a is translated by the virtualized processor of guest VM 32 into an address of a page 60b of virtualized physical memory space 114 of VM 32, according to page tables configured and controlled by guest OS 34. Hypervisor 30, which configures and controls virtualized physical memory 114, then maps the address of page 60b to an address of a page 60c within physical memory 14 of host system 10, for instance using SLAT means as discussed above.

In some embodiments, hypervisor 30 sets up its own virtual memory space 214b comprising a representation of physical memory 14, and employs a translation mechanism (for instance, page tables) to map addresses in space 214b into addresses in physical memory 14. In FIG. 5, such an exemplary mapping translates an address of page 60c into an address of a page 60h. Such mappings allows hypervisor 30 to manage (e.g., read from, write to, and control access to) memory pages belonging to software objects executing within various VMs running on host system 10.

FIG. 5 further illustrates a page swapping operation performed by guest OS 34. Page swapping is a common feature of modern operating systems, used to efficiently manage available memory resources. In some embodiments, swapping a page out of memory comprises the OS moving a content of the respective page from memory to a storage device (e.g., disk), so that the respective page may be used to store other data. At a later time, the OS may perform a swap-in of the page, by moving the respective content back from storage into memory, possibly at an address distinct from address of the original page storing the content. To complete the swap-in, the OS may modify a page table entry of the respective page to reflect the address change. In the example illustrated in FIG. 5, page 60c is swapped out to a page 60d on a storage device. Since OS 34 executes within a virtual machine, OS 34 sees virtualized physical memory 114 as its physical memory, and virtualized storage device 120 as its physical storage. So swapping page 60c out of memory effectively comprises moving a content of page 60c to virtualized storage device 120. Device 120 may comprise an abstraction created by hypervisor 30 of physical storage device 20, so the content of page 60d may actually be redirected to a page 60k on device 20. In some embodiments, hypervisor 30 may give guest VM 32 direct access to storage device 20, for instance using VT-d technology from Intel®. In such configurations, virtualized storage device 120 may coincide with an actual physical storage device of host system 10. To perform a swap-in, OS 34 may move the content of page 60d to a page 60e of virtualized physical memory 114. Guest OS 34 may further modify a page table entry corresponding to page 60a to indicate an address translation from page 60a to page 60e (dashed arrow in FIG. 5). Page 60e may be mapped to a page 60m in physical memory 14.

Figure 6:
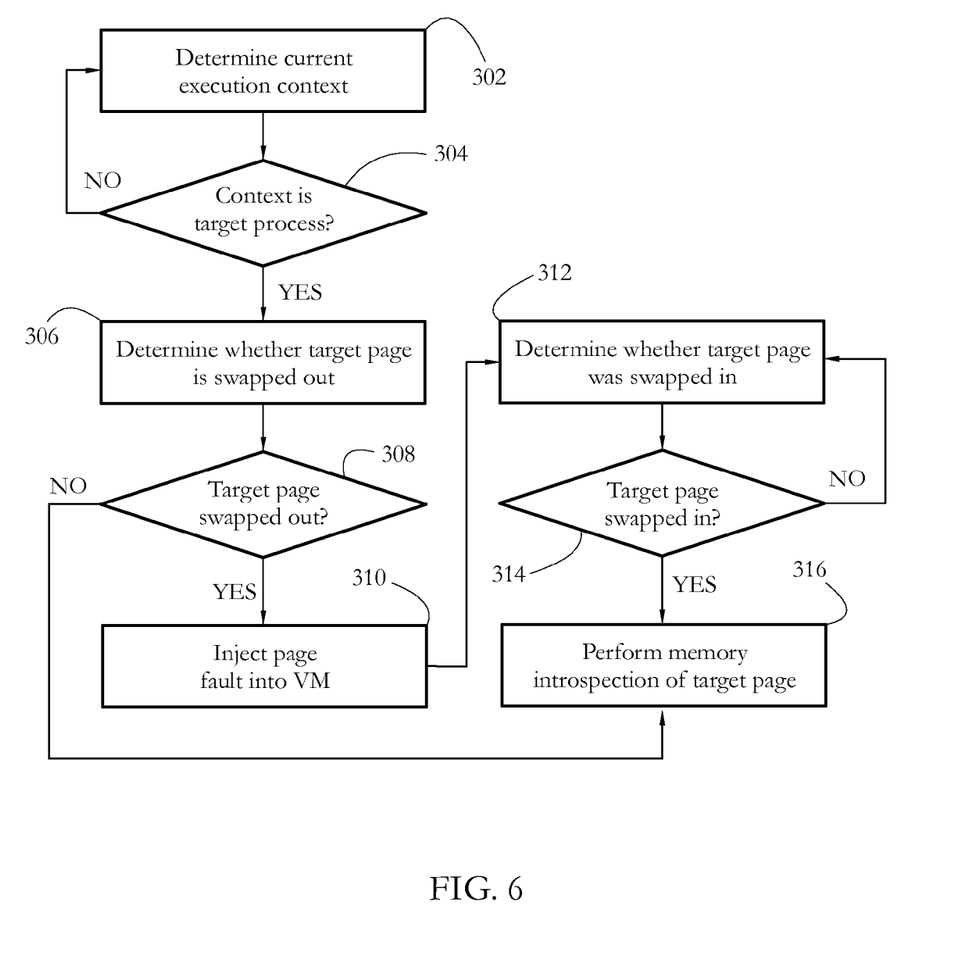
FIG. 6 shows an exemplary sequence of steps executed by the memory introspection engine to protect a virtual machine from malware according to some embodiments of the present invention.

FIG. 6 shows an exemplary sequence of steps performed by memory introspection engine 40 to protect a virtual machine from malware according to some embodiments of the present invention. Such anti-malware protection include, for instance, identifying a page (hereafter deemed target page) of a memory space of a selected process (hereafter deemed target process) executing within the respective VM, and protecting the content of the respective page from unauthorized modification, e.g., by a malicious software entity. In another example, introspection engine 40 may determine whether the target page contains malicious code. The target process may belong, for instance, to an application such as applications 42e-f, or to guest OS 34 in FIG. 4. When the target process executes at user-level processor privilege (e.g., user mode in Windows®), the content of the target page may not reside in memory at all times, but instead may be occasionally swapped in and out of memory by the OS. By executing outside the VM 32, memory introspection engine 40 may not have direct access to the content of such swapped-out memory pages.

In a sequence of steps 302-304, engine 40 waits until the current execution context is that of the target process, i.e., until the currently executing instructions belong to the target process. Determining the current execution context may comprise, for instance, reading a content of a CR3 register of the virtual processor of the respective VM (the CR3 register of x86 platforms stores an address of a paging structure, which uniquely identifies each executing process). When the execution context is that of the target process, in a sequence of steps 306-308, engine 40 may determine whether the content of the target page is currently swapped out of memory. When the content of the target page is in memory, in a step 316, engine 40 may proceed to introspect the target page, e.g., to analyze and/or protect the content of the target page. When the content of the target page is currently swapped out, in a step 310, engine 40 directly injects a page fault into the respective VM, to force a swap-in of the target page as described in more detail below. Next, in a sequence of steps 312-314, engine 40 waits until the target page is swapped in, i.e., until the content of the respective page is mapped to the virtualized physical memory of the respective VM, to perform introspection.

To determine whether the target page resides in memory (steps 306-308), as well as to determine whether the target page has been swapped in (steps 312-314), memory introspection engine 40 may access a content of a page table set up by OS 34. In some embodiments, a field (e.g., a dedicated bit) of the page table entry of the target page indicates whether the respective page is currently present in memory.

Figure 7:
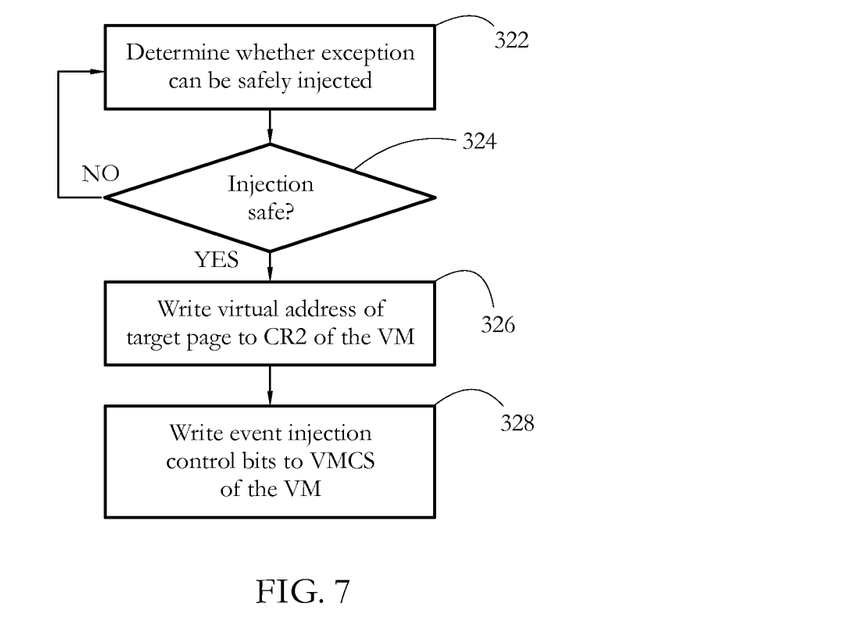
FIG. 7 shows an exemplary sequence of steps performed by the memory introspection to carry out a direct page fault injection according to some embodiments of the present invention.

FIG. 7 illustrates an exemplary sequence of steps performed by engine 40 to directly inject a page fault, thus forcing the swap-in of the target page (step 310 in FIG. 6). In a step sequence 322-324, engine 40 evaluates a current state or virtual processor 112 to determine whether a page fault exception can be safely injected into VM 32. Step 322 may comprise evaluating the priority of interrupt requests currently under processing. In a Microsoft Windows® system, such evaluation may comprise determining a current interrupt request level (IRQL), for instance by looking up a content of a segment register of VM 32. Such exemplary registers include the FS and/or GS registers of the x86 processor architecture, storing a pointer to a data structure including the IRQL. In an exemplary embodiment, when IRQL<2, injecting a page fault is considered safe. When there are higher-priority interrupts in waiting (e.g., IRQL≥2), steps 322-324 wait for the high-priority requests to be serviced.

In some embodiments, step 322 may include determining the privilege level (ring) that virtual processor 112 is currently executing at. In host systems running Microsoft Windows®, while the processor is executing in user mode (ring 3), IRQL is zero, so injection of a page fault corresponding to a user-mode page may be considered safe. When processor 112 executes in kernel mode (ring 0), additional determinations may be needed to infer whether fault injection is safe.

A sequence of steps 326-328 injects a page fault exception into VM 32, the exception configured to trigger a swap-in of the target page. In an exemplary embodiment, in step 326, engine 40 writes a virtual address of the target page into the CR2 register of the virtual processor of the respective VM, indicating to OS 34 which virtual page to swap into memory. Next, in step 328, engine 40 triggers the exception within virtualized processor 112, for instance by writing to a set of control bits of a virtual machine control structure (VMCS) of VM 32, the respective control bits configurable to trigger a page fault within the respective VM. On Intel® processors configured to support virtualization, such control bits are part of the VM Entry Event Injection field of the VMCS.

VM control structures are a special kind of data structures maintained by hypervisor 30 to describe guest VMs executing on host system 10. The format of the VMCS may be implementation- and/or platform-specific. For VMs comprising multiple virtualized processors 112, hypervisor 30 may maintain a distinct VMCS for each virtual processor. In some embodiments, each VMCS may comprise a guest state area and a host state area, the guest state area storing data such as CPU state and/or content of control registers of the respective virtual processor, and the host state area storing similar data for hypervisor 30. In some embodiments, processor 12 associates a region in memory with each VMCS, named VMCS region. Software may reference a specific VMCS using an address of the region (e.g., a VMCS pointer). At any given time, at most one VMCS may be loaded on processor 12, representing the VM currently having control of the processor.

Figure 8:
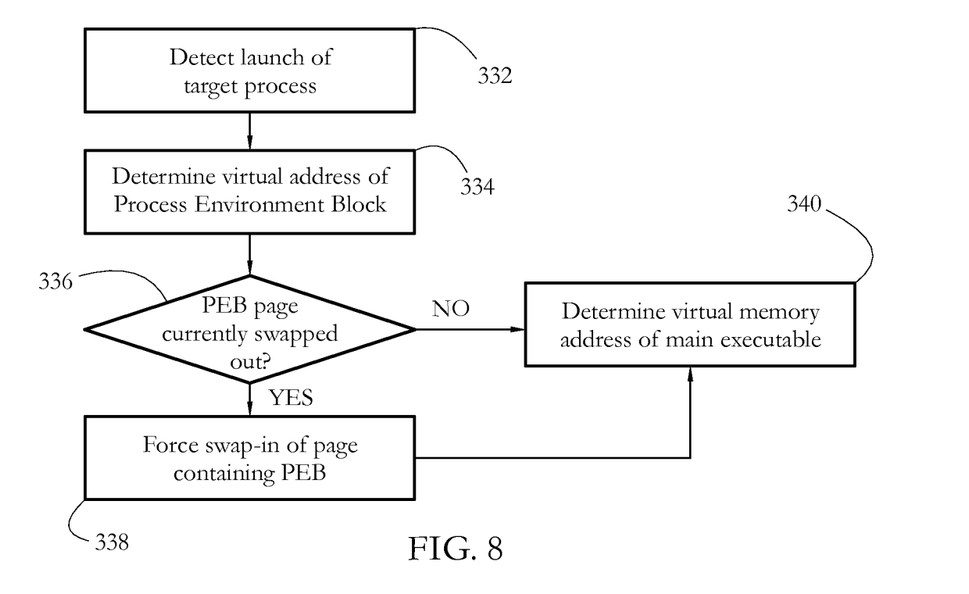
FIG. 8 shows an exemplary sequence of steps illustrating an application of the methods of FIGS. 6-7, according to some embodiments of the present invention.
Figure 9:
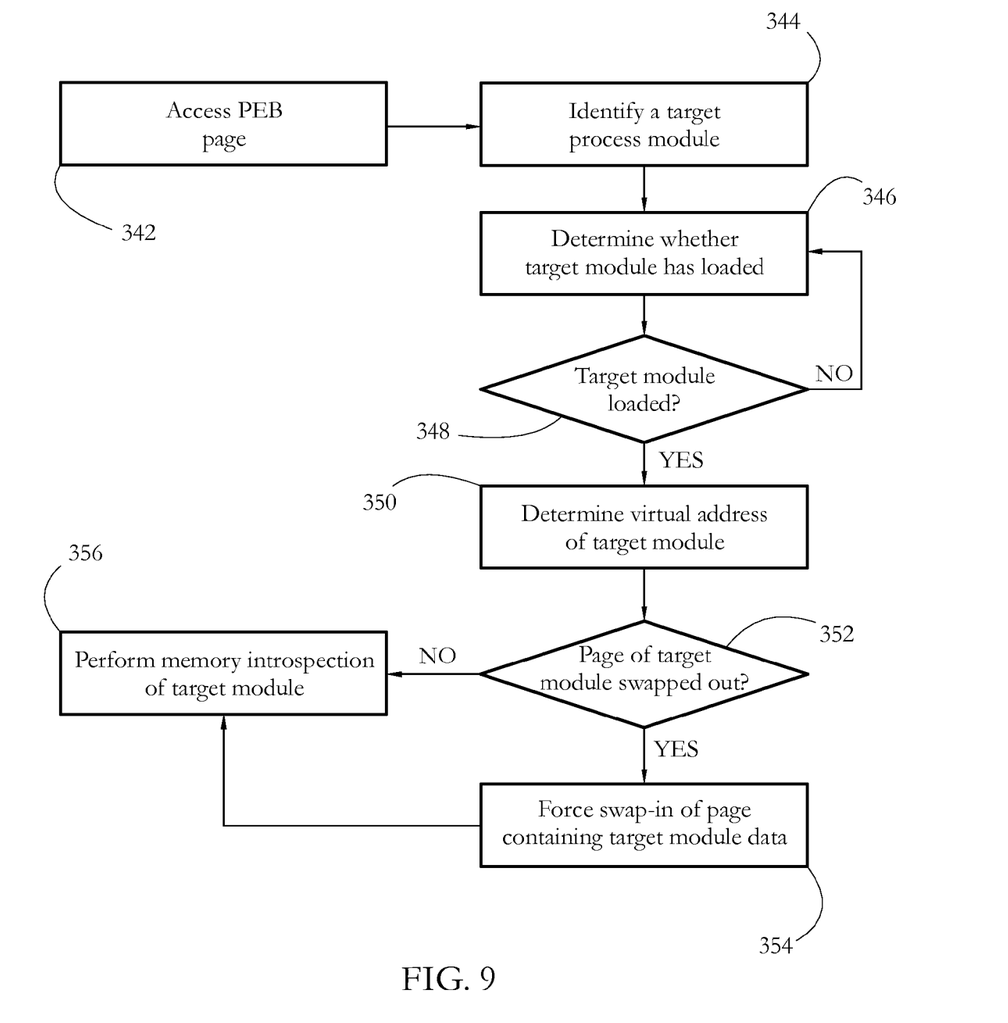
FIG. 9 shows an exemplary sequence of steps illustrating another application of the methods of FIGS. 6-7, according to some embodiments of the present invention.
Figure 10:
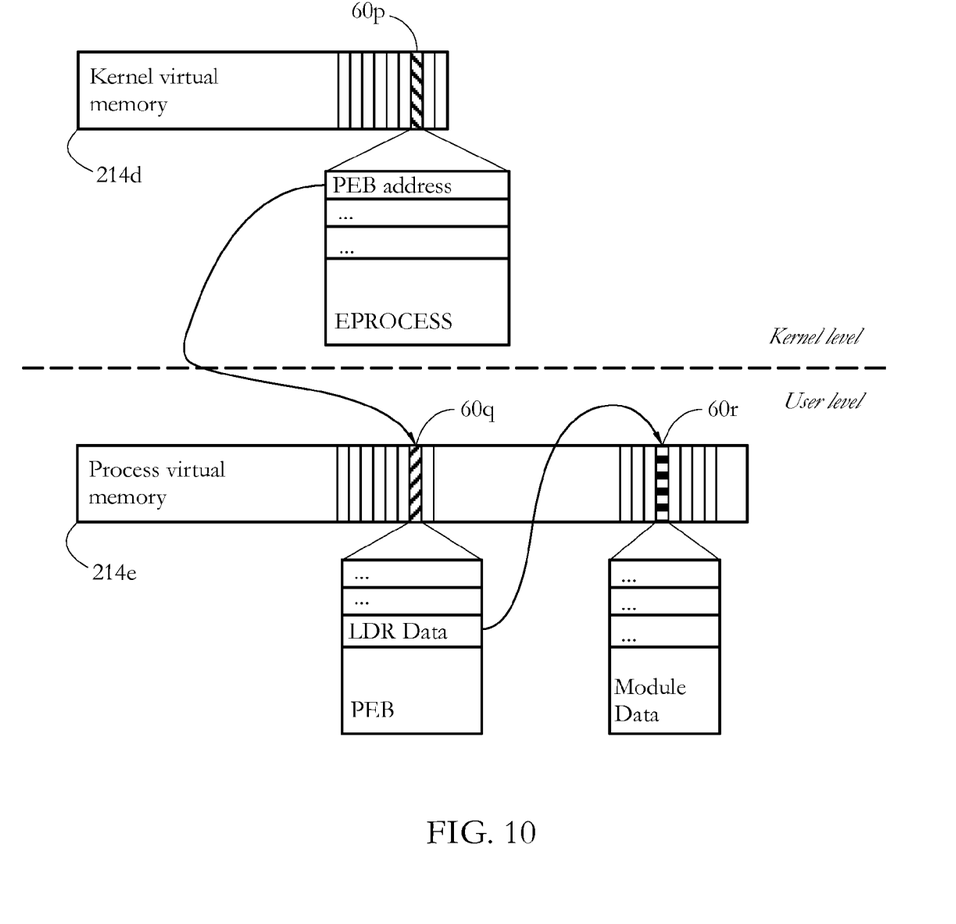
FIG. 10 illustrates an exemplary determination of a set of virtual addresses of memory pages containing data of a target process, according to some embodiments of the present invention.

FIGS. 8-9 show exemplary applications of some embodiments of the present invention in a Windows® environment. FIG. 8 illustrates a sequence of steps performed by engine 40 to determine a virtual memory address of a main executable of a target process. In a step 332, engine 40 may detect a launch of the target process. Step 332 may employ any method known in the art, such as intercepting a mechanism of the OS that manages the list of active processes. For instance, in Windows®, each time a process is created, an indicator of the respective process is inserted into the list of active processes; the indicator is removed from the list upon termination of the respective process. In some embodiments, upon launching a process, OS 34 also sets up a process-specific data structure known as a process environment block (PEB) comprising data used by OS 34 to manage resources associated to the respective process. By intercepting (e.g., placing a hook on) an OS instruction to insert the target process into the list of active processes, engine 40 may obtain information such as a memory address of the respective PEB, which engine 40 may extract in a step 334. In Windows, the virtual address of the PEB is stored in a data structure of the OS, known as the executive process block (EPROCESS). FIG. 10 shows an illustrative diagram of such process-specific data structures.

Being a user-level data structure, the virtual memory page containing PEB data may or may not currently reside in memory. In a step 336 engine 40 determines whether the respective virtual memory page is swapped out, and if no, in a step 340 engine 40 proceeds to determine a virtual address of the main executable of the target process, for instance by parsing the PEB data. When the PEB data is currently swapped out of memory, a step 338 forces a swap-in of the respective page containing PEB data, using for example, a mechanism as described above in relation to FIG. 7.

FIG. 9 shows an exemplary sequence of steps carried out by engine 40 to perform memory introspection of an executable module (such as a library) loaded by the target process. Malware often uses DLLs as vectors for carrying malicious code, so analyzing the content of such libraries may be important for anti-malware operations. After accessing the virtual page containing PEB data in a step 342 (see e.g., steps 336-338 above), in a sequence of steps 344-346-348 engine 40 identifies a target module, e.g., a dynamic-link library (DLL), used by the target process, and determines whether the respective module has loaded. When the target module has loaded, engine 40 may determine a virtual address of the respective module in a step 350, for instance according to a specific data field of the PEB (see e.g., FIG. 10). In a step 352, engine 40 determines whether the virtual page containing module data and residing at the address determined in step 350 is currently swapped out of memory, and when no, in a step 356, proceeds to perform memory introspection of the respective module. When the virtual page of the respective module is currently swapped out, in a step 354, engine 40 forces a swap-in of the respective virtual page using, for instance, the mechanism described above in relation to FIG. 7.

FIG. 10 shows an exemplary determination of virtual addresses in a Windows® environment. In some embodiments, OS 34 maintains a kernel virtual memory space 214d, wherein a page located at virtual address 60p contains a part of the EPROCESS structure used by OS 34 to manage execution of the target process. Address 60p may be determined, for instance, by intercepting the launch of the target process (see, e.g., step 332 in FIG. 8). A field of the EPROCESS data structure holds an indicator (e.g., a pointer) of the process environment block (PEB) of the target process. The pointer indicates a virtual address 60q within a process virtual memory 214e assigned to the target process by OS 34. The PEB structure further includes a pointer to a structure (LDR data) containing information about executable modules (e.g. libraries) loaded by the target process. The LDR data is located at an address 60r within space 214e. By walking the hierarchy of process management data structures set up by OS 34, introspection engine 40 may thus determine a plurality of virtual addresses of objects targeted for introspection. When the content of memory pages located at such addresses is swapped out of RAM, engine 40 may force OS 34 to swap the respective pages in using methods described herein.

The exemplary systems and methods described above allow protecting a host system from malware using virtualization technology. In some embodiments, a memory introspection engine operates below the virtual machines executing on the host system. The memory introspection engine may protect a virtual machine by analyzing the contents of a memory page used by a process executing within the respective virtual machine. The introspection engine may thus determine, from outside the respective VM, whether the code of the respective process contains malware.

In some embodiments, the introspection engine may also prevent an unauthorized modification (e.g., by malware) of some critical objects, such as certain drivers and page tables, among others. To protect such an object, some embodiments may prevent changes by intercepting an attempt to write to a memory page allocated to the respective object. Such interceptions may be performed from the level of the hypervisor.

In conventional anti-malware systems, security applications execute at a processor privilege level similar to that of the operating system or of common applications. Such systems may be vulnerable to advanced malware also operating at the privilege level of the operating system. In contrast, in some embodiments of the present invention, a hypervisor executes at the most privileged level (e.g., root mode or ring −1), displacing the operating system to a virtual machine. The memory introspection engine may execute at the same processor privilege level as the hypervisor. Anti-malware operations may thus be conducted from a processor privilege level higher than that of the operating system. In some embodiments, a single memory introspection engine may protect multiple virtual machines executing concurrently on the respective computer system.

Although the memory introspection engine executes outside the virtual machine targeted for protection, the engine may determine virtual addresses used by software objects running within the protected VM. However, when such virtual addresses point to content of pages which are currently swapped out of memory by the operating system, the memory introspection engine does not have access to the respective content. In some embodiments of the present invention, when a page is currently swapped out, memory introspection engine may force the OS to swap the respective page in, making the content of the respective page available for analysis and/or protection. To force the swap-in, the memory introspection engine may trigger a processor event, such as a page fault exception, within the virtualized processor of the respective virtual machine, the processor event configured to cause the operating system to bring the swapped-out page back to memory. Triggering the processor event may comprise, for instance, writing to a set of control bits of a virtual machine control structure used by the respective virtual machine. The memory introspection engine may thus inject a page fault into the respective virtual machine without assistance from the OS or from other software executing within the respective VM.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising a hardware processor configured to operate:
   a hypervisor configured to expose a virtual machine comprising a virtualized processor and a virtualized memory, the virtual machine configured to employ the virtualized processor to execute a target process, wherein exposing the virtual machine comprises configuring a data structure to store a current state of the virtualized processor, the data structure comprising an event injection field which, when set to a predetermined value, causes the virtualized processor to generate a page fault; and
   a memory introspection engine executing outside the virtual machine and configured to:
      determine according to a page table of the virtual machine whether a target page of a virtual memory space of the target process is swapped out of the virtualized memory; and
      in response, when the target page is swapped out of the virtualized memory, directly inject the page fault into the virtual machine, the page fault causing an operating system of the virtual machine to map the target page to a page of the virtualized memory, wherein directly injecting the page fault comprises the memory introspection engine writing the predetermined value to the event injection field.

2. The host system of claim 1, wherein directly injecting the page fault comprises the memory introspection engine writing a virtual address of the target page to a register of the virtualized processor.

3. The host system of claim 1, wherein the memory introspection engine is further configured to:
   in preparation for directly injecting the page fault, determine whether an injection condition is satisfied according to the current state of the virtualized processor; and
   in response, directly inject the page fault when the injection condition is satisfied.

4. The host system of claim 3, wherein determining whether the event injection condition is satisfied comprises determining a current interrupt request level (IRQL) of the virtualized processor.

5. The host system of claim 3, wherein determining whether the event injection condition is satisfied comprises determining a privilege level that the virtualized processor is currently executing at.

6. The host system of claim 3, wherein determining whether the event injection condition is satisfied comprises determining a current execution context of the virtualized processor.

7. The host system of claim 3, wherein the memory introspection engine is further configured, in response to determining whether the injection condition is satisfied, when the injection condition is not satisfied, to delay injecting the page fault until the injection condition is satisfied.

8. The host system of claim 1, wherein the memory introspection engine is further configured, in response to directly injecting the page fault, to:
   detect a modification of a page table entry of the target page; and
   in response, determine whether the target page was mapped to the page of the virtualized memory according to the modification.

9. The host system of claim 1, wherein the memory introspection engine is further configured to determine whether the target process is malicious according to a content of the target page.

10. The host system of claim 1, wherein the memory introspection engine is further configured to intercept an attempt to modify a content of the target page.

11. The host system of claim 1, wherein the memory introspection engine is further configured, in preparation for determining whether the target page is swapped out of the virtualized memory, to:
   detect an event of the virtualized processor, the event indicative of a launch of the target process within the virtual machine; and
   in response, determine a virtual address of the target page according to the event.

12. A method comprising:
   employing at least one hardware processor of a host system to execute a hypervisor, the hypervisor configured to expose a virtual machine comprising a virtualized processor and a virtualized memory, the virtual machine configured to employ the virtualized processor to execute a target process, wherein exposing the virtual machine comprises configuring a data structure to store a current state of the virtualized processor, the data structure comprising an event injection field which, when set to a predetermined value, causes the virtualized processor to generate a page fault;
   employing the at least one hardware processor to determine whether a target page of a virtual memory space of the target process is swapped out of the virtualized memory; and
   in response, when the page is swapped out of the virtualized memory, employing the at least one hardware processor to directly inject the page fault into the virtual machine, the page fault causing an operating system of the virtual machine to map the target page to a page of the virtualized memory, wherein directly injecting the page fault comprises writing the predetermined value to the event injection field.

13. The method of claim 12, wherein directly injecting the page fault comprises writing a virtual address of the target page to a register of the virtualized processor.

14. The method of claim 12, further comprising, in preparation for directly injecting the page fault:
   employing the at least one hardware processor to determine whether an injection condition is satisfied according to the current state of the virtualized processor; and
   in response, employing the at least one hardware processor to directly inject the page fault when the injection condition is satisfied.

15. The method of claim 14, wherein determining whether the event injection condition is satisfied comprises determining a current interrupt request level (IRQL) of the virtualized processor.

16. The method of claim 14, wherein determining whether the event injection condition is satisfied comprises determining a privilege level that the virtualized processor is currently executing at.

17. The method of claim 14, wherein determining whether the event injection condition is satisfied comprises determining a current execution context of the virtualized processor.

18. The method of claim 14, further comprising, in response to determining whether the injection condition is satisfied, when the injection condition is not satisfied, delaying injection of the page fault until the injection condition is satisfied.

19. The method of claim 12, further comprising, in response to directly injecting the page fault:
   employing the at least one hardware processor to detect a modification of a page table entry of the target page; and
   in response, employing the at least one hardware processor to determine whether the target page was mapped to the page of the virtualized memory according to the modification.

20. The method of claim 12, further comprising employing the at least one hardware processor to determine whether the target process is malicious according to a content of the target page.

21. The method of claim 12, further comprising employing the at least one hardware processor to intercept an attempt to modify a content of the target page.

22. The method of claim 12, further comprising, in preparation for determining whether the target page is swapped out of the virtualized memory:
   employing the at least one hardware processor to detect an event of the virtualized processor, the event indicative of a launch of the target process within the virtual machine; and
   in response, employing the at least one hardware processor to determine a virtual address of the target page according to the event.

23. A non-transitory computer-readable medium storing instructions which, when executed by at least one hardware processor of a host system, cause the host system to form a memory introspection engine, wherein the host system executes a hypervisor exposing a virtual machine comprising a virtualized processor and a virtualized memory, the virtual machine configured to employ the virtualized processor to execute a target process, wherein exposing the virtual machine comprises configuring a data structure to store a current state of the virtualized processor, the data structure comprising an event injection field which, when set to a predetermined value, causes the virtualized processor to generate a page fault, wherein the memory introspection engine executes outside the virtual machine, and wherein the memory introspection engine is configured to:
   determine according to a page table of the virtual machine whether a target page of a virtual memory space of the target process is swapped out of the virtualized memory; and
   in response, when the target page is swapped out of the virtualized memory, directly inject the page fault into the virtual machine, the page fault causing an operating system of the virtual machine to map the target page to a page of the virtualized memory, wherein directly injecting the page fault comprises the memory introspection engine writing the predetermined value to the event injection field.

\* \* \* \* \*